(12) United States Patent
Kim et al.

(10) Patent No.: US 12,679,441 B2
(45) Date of Patent: Jul. 14, 2026

(54) STEERING CONTROL SYSTEM AND METHOD FOR SAFE DRIVING

(71) Applicant: HL MANDO CORPORATION, Gyeonggi-do (KR)

(72) Inventors: Taesik Kim, Gyeonggi-do (KR); Minsu Seo, Gyeonggi-do (KR); Beomhee Jang, Gyeonggi-do (KR); Jaehoon Bae, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/647,958

(22) Filed: Apr. 26, 2024

(65) Prior Publication Data

US 2024/0359732 A1     Oct. 31, 2024

(30) Foreign Application Priority Data

Apr. 26, 2023  (KR) ........................ 10-2023-0054777
Sep. 26, 2023  (KR) ........................ 10-2023-0129858

(51) Int. Cl.
B62D 5/00          (2006.01)
B62D 5/04          (2006.01)
(Continued)

(52) U.S. Cl.
CPC ........... B62D 5/003 (2013.01); B62D 5/0484 (2013.01); B62D 6/00 (2013.01); B62D 15/025 (2013.01)

(58) Field of Classification Search
CPC .......... B62D 5/001–006; B62D 15/025; B62D 6/001–10
See application file for complete search history.

(56) References Cited

U.S. PATENT DOCUMENTS

| | | | | |
|---|---|---|---|---|
| 10,752,282 B2 * | 8/2020 | Klesing | ................. | B62D 5/0481 |
| 11,958,546 B2 * | 4/2024 | Jeong | ................... | B62D 5/0484 |
| 2024/0075981 A1 * | 3/2024 | Wyciechowski | ... | B60W 40/105 |

FOREIGN PATENT DOCUMENTS

| | | |
|---|---|---|
| JP | 7252881 | 4/2023 |
| KR | 10-0589167 | 6/2006 |

(Continued)

OTHER PUBLICATIONS

Office Action dated Apr. 30, 2026 for Korean Patent Application No. 10-2023-0129858 and its English translation provided by Applicant's foreign counsel.

*Primary Examiner* — Mark L. Greene
(74) *Attorney, Agent, or Firm* — WOMBLE BOND DICKINSON (US) LLP

(57)          ABSTRACT

A steering control system comprises: a first steering controller including a first input-side control module generating first steering control information and a first output-side control module controlling a steering motor; and a second steering controller including a second input-side control module generating second steering control information and a second output-side control module controlling the steering motor. The steering control system is configured to, when steering of a vehicle is unable to be controlled by the first steering controller and the second steering controller, receive autonomous driving steering information to control the steering of the vehicle or transmit the first or second steering control information to perform cooperative control, thereby enhancing safe driving and being capable of controlling the steering of the vehicle even when a failure occurs in one or more control modules included in the steering control system.

19 Claims, 12 Drawing Sheets

(51) Int. Cl.
    B62D 6/00           (2006.01)
    B62D 15/02        (2006.01)

(56)           References Cited

FOREIGN PATENT DOCUMENTS

| KR | 10-2018-0032044 | 3/2018 | |
| KR | 10-2066221 | 1/2020 | |
| KR | 10-2023-0046373 | 4/2023 | |
| WO | WO-2020256338 A1 * | 12/2020 | ....... H04L 12/40189 |

* cited by examiner

STEERING CONTROL SYSTEM AND METHOD FOR SAFE DRIVING

CROSS-REFERENCE TO RELATED APPLICATION

This application claims priority to and benefit from Korean Patent Application Nos. 10-2023-0054777, filed on Apr. 26, 2023, and 10-2023-0129858, filed on Sep. 26, 2023, which are hereby incorporated by reference for all purposes as if fully set forth herein.

BACKGROUND

Field

Embodiments of the present disclosure generally relate to a steering control system and method for safe driving.

Description of Related Art

Steer-by-wire (SBW) steering devices may have no mechanical/physical linkage, such as universal joint or pinion shaft, between a steering wheel and vehicle wheels, but may use a motor instead to steer the vehicle.

The SbW steering system controls steering through electrical signals without mechanical connection elements. Therefore, a need arises to secure a higher level of safety for the SbW steering system. For this reason, the need for a specific design that may secure redundancy of steering control information used to control the vehicle's steering motor is increasing.

SUMMARY

There may be provided a steering control system and method for safe driving in which a steering control device generates steering control information and controls a steering control motor based on the generated steering control information.

Further, according to some embodiments of the present disclosure, there may be provided a steering control system and method for safe driving that may control steering through autonomous driving information or cooperative control even when a failure occurs in one or more control modules included in the steering control system.

In an aspect, according to certain embodiments of the present disclosure, a steering control system implemented in a steer-by-wire (SbW) type may comprise a first steering control device including a first input-side control module generating first steering control information and a first output-side control module controlling a steering motor to control steering and a second steering control device including a second input-side control module generating second steering control information and a second output-side control module controlling the steering motor to control steering.

Here, when steering control by the first steering control device and the second steering control device may not be performed, autonomous driving steering information may be received to control steering, or either the first steering control information or the second steering control information may be transmitted to perform cooperative control.

In another aspect, according to some embodiments of the present disclosure, a steering control method implemented in a steer-by-wire (SbW) type may comprise generating first steering control information through a first input-side control module included in a first steering control device, generating second steering control information through a second input-side control module included in a second steering control device, and controlling steering by controlling a steering motor by a first output-side control module included in the first steering control device and a second output-side control module included in the second steering control device.

Here, controlling steering may, when steering control by the first steering control device and the second steering control device may not be performed, receive autonomous driving steering information to control steering, or either the first steering control information or transmit the second steering control information to perform cooperative control.

According to certain embodiments of the present disclosure, there may be provided a steering control system and method capable of responding to a failure in one or more control modules included in the steering control system by generating autonomous driving steering information or performing cooperative control when a failure occurs in one or more steering control modules included in the steering control system, thereby controlling the steering of the vehicle even when a failure occurs in the control module of the steering control system.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION OF EXEMPLARY EMBODIMENTS

Figure 1:
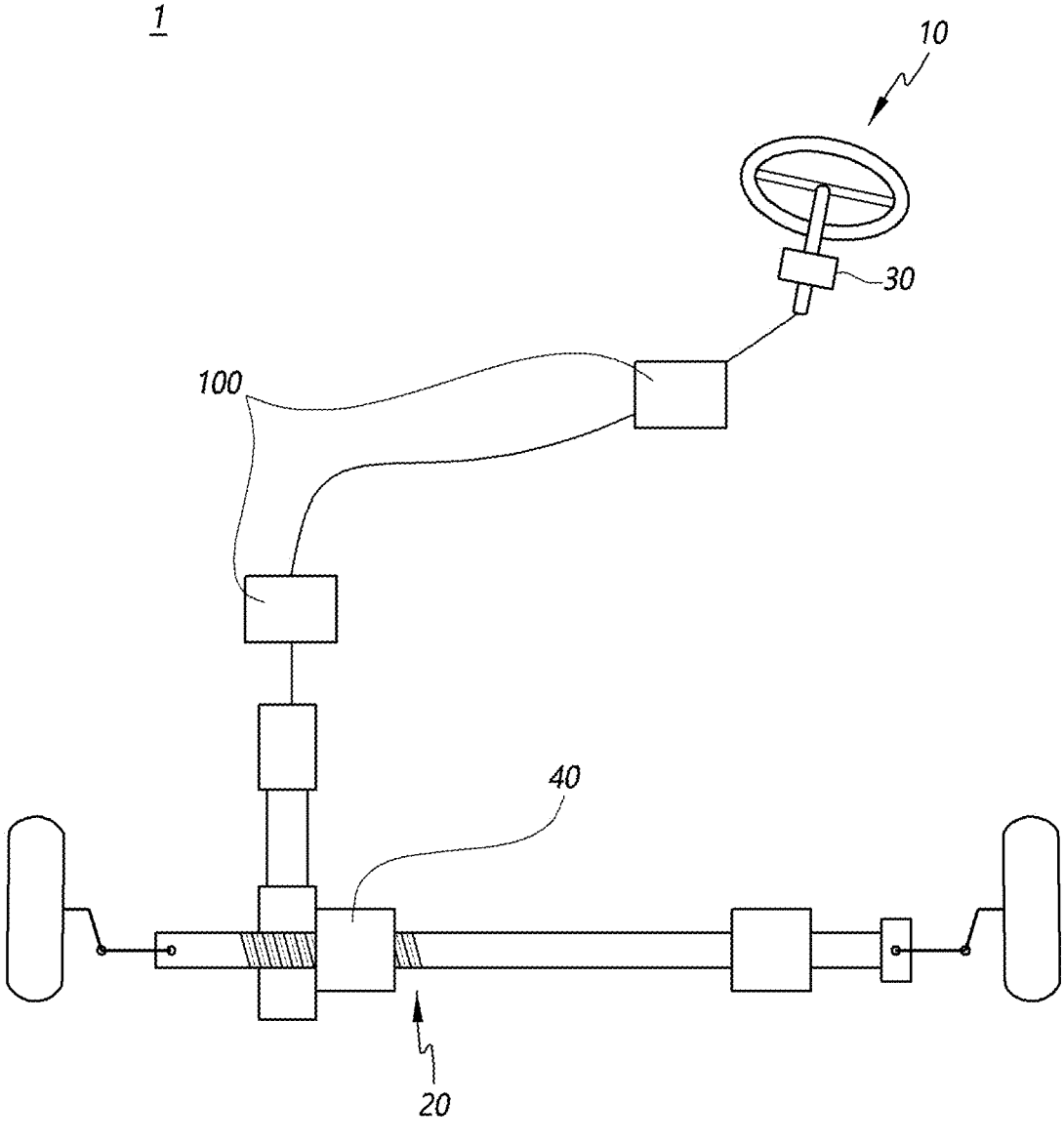
FIG. 1 is a schematic diagram for schematically illustrating a configuration of a steering system according to an embodiment of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control system and method for safe driving according to embodiments of the disclosure is described with reference to the related drawings.

FIG. 1 is a schematic diagram for schematically illustrating a configuration of a steering system according to an embodiment of the present disclosure.

The steering system 1 according to the embodiment illustrated in FIG. 1 may be implemented in a steer-by-wire (SbW) type. The steering system 1 may include a steering feedback actuator (SFA) 10, a steering control system 100, a road wheel actuator (RWA) 20, and the like. When the steering system 1 is an SbW system, the SFA 10 and the RWA 20 may be mechanically separated or may not be mechanically connected to each other.

The SFA 10 may include a steering wheel, a steering shaft, and a reaction force motor 30. The SFA 10 may further include a steering gear for transferring the rotational force of the reaction force motor 30 to the steering shaft.

The steering wheel may be configured to be rotatable between a left steering lock end and a right steering lock end with the steering shaft as a rotation axis. Here, the lock end may be a limit point beyond which the steering wheel cannot be further rotated.

The reaction force motor 30 of the SFA 10 may receive a control signal such as a command current from the steering control system 100 and provide a feedback torque to the steering wheel in order to provide steering feedback to a driver. For example, the reaction force motor 30 may receive a command current from the steering control system 100 and drive at a rotational speed corresponding to the command current to generate a feedback torque, and may transfer the feedback torque to the steering wheel through one or more components such as a shaft and a gear, for example, a worm and a worm wheel.

The SFA 10 may include one or more sensors, for example, but not limited to, a steering angle sensor configured to detect a steering angle of the steering wheel, a torque sensor configured to sense a torque applied to the steering shaft, and a steering angular velocity sensor configured to detect a steering angular velocity or rotational velocity of the steering wheel.

The steering control system 100 may receive steering control information (e.g. sensing information) from each sensor included in the SFA 10 to calculate a control value, and output an electrical signal indicating a control value to the RWA 20. The steering control information may mean, for instance, but not limited to, information including at least one of a steering angle, a steering angular velocity, and a steering torque.

Meanwhile, the steering control system 100 may calculate a control value by receiving feedback of power information (e.g., rack position information) actually output from the RWA 20, and output an electrical signal indicating, or associated with, the control value to the SFA 10, thereby providing a sense of steering to the driver. The RWA 20 may refer to a device that mechanically or actually drives the vehicle to steer. The RWA 20 may include, for instance, but not limited to, a steering motor 40, a rack bar, one or more vehicle wheels, a vehicle velocity sensor, a rack position sensor, and the like.

The SFA 10 and the RWA 20 may further include a motor torque sensor configured to detect the motor torque of the reaction force motor 30 and the steering motor 40, respectively.

The steering motor 40 may axially or linearly move the rack bar. For instance, the steering motor 40 may receive a command current from the steering control system 100 and drive in response to the command current to linearly move the rack back in the axial direction of the vehicle wheel. In other words, the rack bar may linearly move between the left lock end, which is the left movement limit point, and the right lock end, which is the right movement limit point.

The rack bar may be linearly moved by the driving of the steering motor 40, and the vehicle wheels may be steered left or right by the linear motion of the rack bar.

Meanwhile, when the steering system 1 is an SbW system and the vehicle travels in the autonomous driving mode, the steering system 1 may control only the RWA 20 to perform steering control of the vehicle, or control both the SFA 10 and the RWA 20 to perform steering control of the vehicle.

Referring back to FIG. 1, the steering system 1 according to an embodiment may include the steering control system 100, the reaction force motor 30, and the steering motor 40.

The configuration of the steering system 1 illustrated in FIG. 1 is merely an example, and the present disclosure is not limited thereto. The steering system 1 may further include other components, or some components may be omitted, if necessary. In this case, according to an example, components of the steering system 1 may be combined with each other or some components may be omitted according to vehicle control schemes.

The steering control system 100 may be implemented as at least one of hardware, software, or a combination thereof, such as an electronic control unit (ECU) including a micro controller unit (MCU), an inverter, a printed circuit board (PCB), electric components, a circuit or the like.

The steering control system 100 may be a device for controlling steering of the vehicle. The steering control system 100 may generate steering control information based on signals obtained from the inside and/or outside of the vehicle. The steering control information may include internal information such as a reaction force motor angle signal, a rackstroke signal, a driving motor angle signal, a torque signal, a steering angle signal, and a yaw rate signal used to control the steering of the vehicle, and detection information about the outside of the vehicle. Accordingly, the steering control system 100 may control a steering device and a braking device of the vehicle and so on based on the steering control information.

Figure 2:
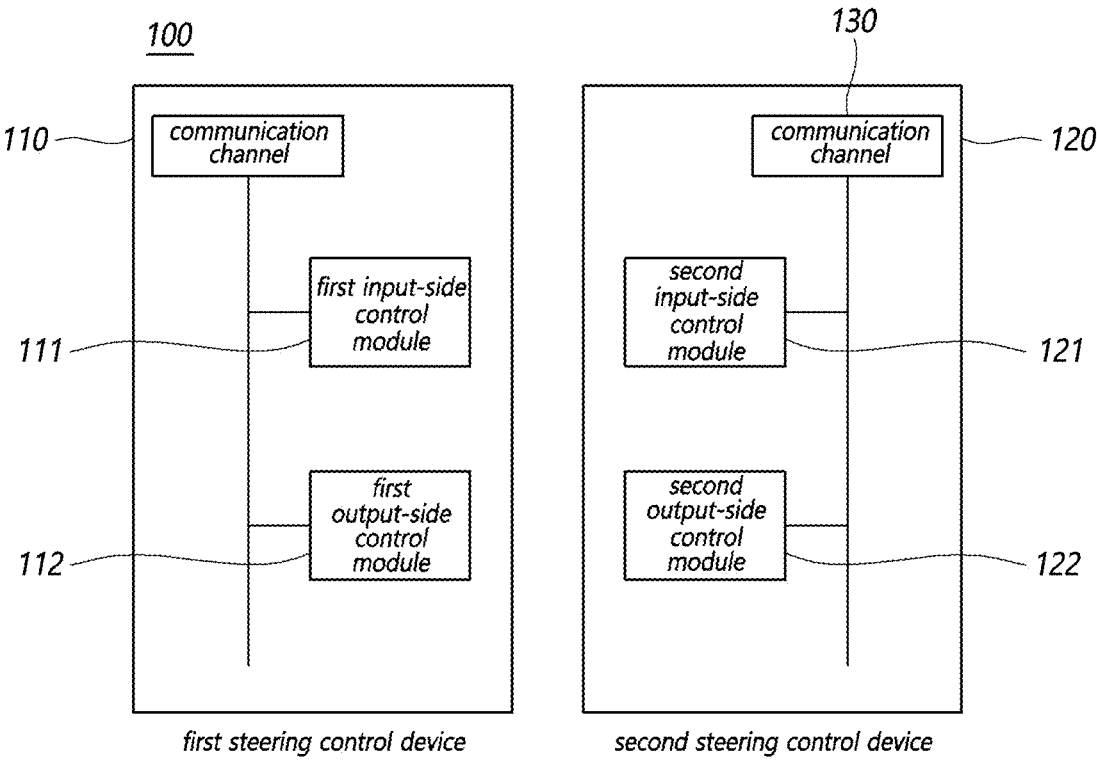
FIG. 2 is a block diagram for illustrating a configuration of a steering control system according to an embodiment of the present disclosure.

FIG. 2 is a block diagram for illustrating a configuration of a steering control system according to an embodiment of the present disclosure.

Referring to FIG. 2, the steering control system 100 according to an embodiment of the present disclosure may include a first steering control device or controller 110 and a second steering control device or controller 120.

The first steering control device or controller 110 may include a first input-side control module 111 configured to generate first steering control information and a first output-side control module 112 configured to control a steering motor. The second steering control device or controller 120 may include a second input-side control module 121 configured to generate second steering control information and a second output-side control module 122 configured to control the steering motor.

The first input-side control module 111, the first output-side control module 112, the second input-side control module 121 and the second output-side control module 122 may be implemented as at least one of hardwares such as an electronic control unit (ECU), a micro controller unit (MCU) or the like. However, this is merely an example, and the present disclosure is not limited thereto.

According to an exemplary embodiment of the present disclosure, the steering control system 100 may be configured to be redundant such that when detecting a failure associated with the first steering control device 110, the first input-side control module 111 transfers a control right for controlling the steering motor to the second input-side control module 121 or, when detecting a failure associated with the second steering control device 120, the second input-side control module 121 transfers the control right for controlling the steering motor to the first input-side control module 111. In an exemplary embodiment, the first input-side control module 111 and the second input-side control module 121 may be configured in a master-slave relationship to generate steering control information. For example, when the first input-side control module 111 does not operate normally, the second input-side control module 121 may generate steering control information. However, this is merely an example, and the present disclosure is not limited thereto. The relationship between the first input-side control module 111 and the second input-side control module 121 may be variously configured as necessary, unless it contradicts the technical spirit of the disclosure.

Likewise, the steering control system 100 may be configured to be redundant such that when detecting a failure associated with the second steering control device or controller 120, the first output-side control module 112 transfers the control right for controlling the steering motor to the second output-side control module 122 or, when detecting a failure associated with the second steering control device or controller 120, the second output-side control module 122 transfers the control right for controlling the steering motor to the first output-side control module 112. In an exemplary embodiment, the first output-side control module 112 and the second output-side control module 122 may be configured in a master-slave relationship to control the steering motor based on the steering control information. However, this is merely an example, and the present disclosure is not limited thereto. The relationship between the first output-side control module 112 and the second output-side control module 122 may be variously configured as necessary, unless it contradicts the technical spirit of the disclosure.

Referring back to FIG. 2, the first output-side control module 112 may receive first steering control information from the first input-side control module 111 through the communication channel 130 to control the steering motor 40. Likewise, the second output-side control module 122 may receive second steering control information from the second input-side control module 121 through the communication channel 130 to control the steering motor 40.

For example, the communication channel 130 transmits and receives steering control information using a control area network (CAN) which is shared communication channel for vehicles and may communicate with modules equipped in the vehicle. Alternatively or additionally, the communication channel 130 may use an inter micro CAN (IMC) connected between two control modules or a private CAN.

Further, the steering control device may control the steering motor at a performance up to 50% even when a failure occurs in any one of the first output-side control module 112 or the second output-side control module 122. For instance, the steering motor 40 may be a dual winding type motor, and the first output-side control module 112 and the second output-side control module 122 each may control the steering motor at a performance up to 50%.

For example, when a failure occurs in the first output-side control module 112, the second output-side control module 122 may receive the second steering control information from the second input-side control module 121 through the communication channel 130 and control the steering motor at a performance up to 50%. Similarly, when a failure occurs in the second output-side control module 122, the first output-side control module 112 may receive the first steering control information from the first input-side control module 111 through the communication channel 130 to control the steering motor at a performance up to 50%.

As another example, when a failure occurs in the first steering control device 110 (e.g. the first input-side control module 111 and/or the first output-side control module 112), the second output-side control module 122 may receive the second steering control information from the second input-side control module 121 through the communication channel 130 to control the steering motor at a performance up to 50%. Similarly, when a failure occurs in the second steering control device 120 (e.g. the second input-side control module 121 and/or the second output-side control module 122), the first output-side control module 112 may receive the first steering control information from the first input-side control module 120 through the communication channel 130 to control the steering motor at a performance up to 50%.

Referring back to FIG. 2, when steering control may not be performed by the first steering control device 110 and the second steering control device 120, the first and/or second steering control device 110 and/or 120 may receive autonomous driving steering information to control steering of the vehicle 1, or transmit either the first steering control information or the second steering control information to perform cooperative control.

As an example, when steering control by the first steering control device 110 and the second steering control device 120 may not be performed, the first or second steering control device 110 and/or 120 may receive autonomous driving steering information through the communication channel 130. Thereafter, at least one module which is in a normal state among the first output-side control module 112 and the second output-side control module 122 may control the steering motor 40 based on the autonomous driving steering information.

As another example, when steering control by the first steering control device 110 and the second steering control device 120 may not be performed, the first and/or second steering control device 110 and/or 120 may transmit at least one of the generated first steering control information or second steering control information through the communication channel 130 to perform cooperative control. For example, the cooperative control may be rear wheel steering which controls steering by controlling the rear wheels or steer-by-brake which controls steering of the vehicle 1 by controlling the brake on each of the wheels of the vehicle 1. In other words, when steering control by the first steering control device 110 and the second steering control device 120 may not be performed, steering control using a rear wheel steering (RWS) system provided in the vehicle or steering control using the steer-by-brake system may be performed. However, this is merely an example for illustration purposes only, and the present disclosure is not limited thereto. As another example, the cooperative control may be performed using, e.g., a function, device, or system capable of controlling steering of the vehicle based on steering information unless it contradicts the technical spirit of the disclosure.

Further, when a failure occurs in the first input-side control module 111, the first output-side control module 112, the second input-side control module 121, and the second output-side control module 122, steering control may be performed according to a predetermined or preset vehicle safe driving operation. For example, when a failure occurs in one or more control modules included in the steering control system 100, the steering control system 100 may perform a limp aside operation configured to prevent more failures from occurring in the vehicle by rebooting the failed control module and executing a performance down mode. Further, the steering control system 100 may perform a stop in place operation that leads the driver to stop the vehicle. Further, the steering control system 100 may send a notification about a control module failure to the driver. For example, the notification of the control module failure may include a warning using an output interface of an in-vehicle display, a speaker, a haptic module, or the like. Alternatively, the notification of the control module failure may include a message transmitted to a personal communication device of the driver (e.g. a driver's phone or mobile computer device such as a tablet or a laptop) communicatively connected to the vehicle or an external server related to control module management.

Therefore, the steering control system 100 can secure safe driving by controlling steering of the vehicle by operations of sharing steering control information, receiving autonomous driving information, and performing cooperative control even when a failure occurs in one or more control modules of the steering control system 100.

Hereinafter, a method for controlling steering of the vehicle using cooperative control and autonomous driving steering information and the connection of a communication channel 130 between control modules configured to control the steering of the vehicle by sharing steering control information even when a failure occurs in one or more control modules included in the steering control system 100 is described in detail with reference to the related drawings.

Figure 3:
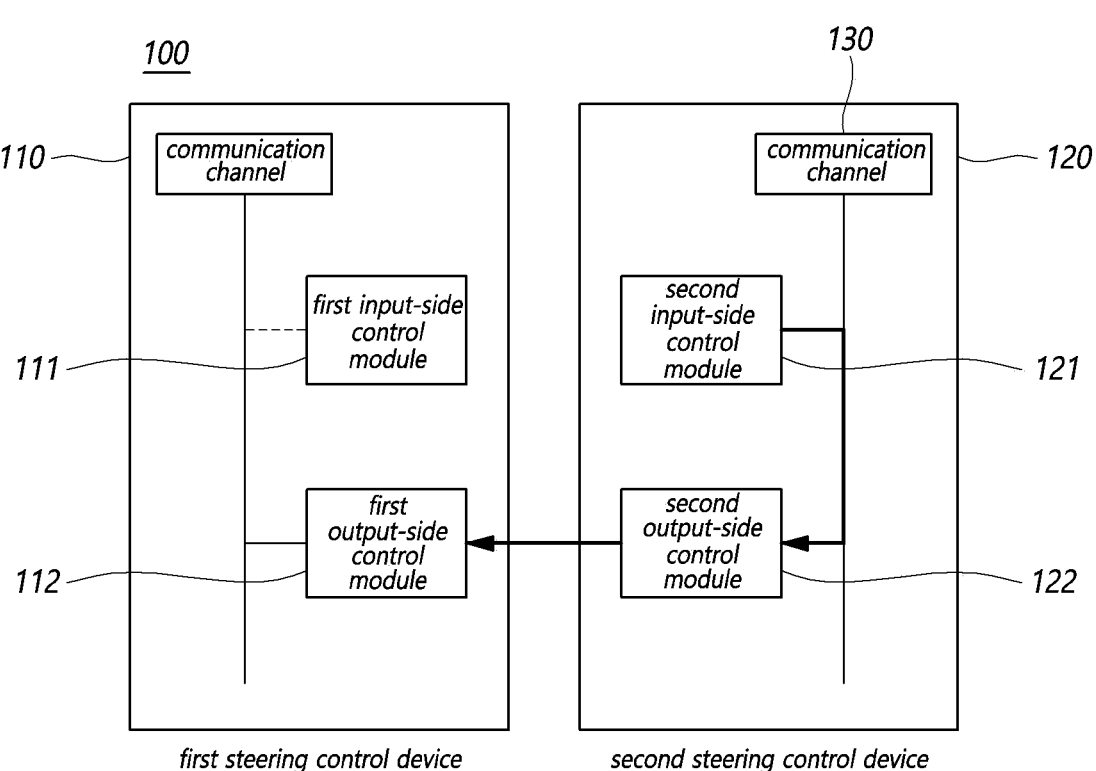
FIG. 3 is an example for illustrating steering control using a communication channel between control modules according to an embodiment of the present disclosure.

FIG. 3 is an example for illustrating steering control using the communication channel 130 connecting between output-side control modules according to an embodiment of the present disclosure.

Referring to FIG. 3, the first output-side control module 112 and the second output-side control module 122 may be connected through the communication channel 130. Accordingly, the first output-side control module 112 may transmit the first steering control information received from the first input-side control module 111 to the second output-side control module 122 through the communication channel 130. Likewise, the second output-side control module 122 may transmit the second steering control information received from the second input-side control module 121 to the first output-side control module 112 through the communication channel 130.

Accordingly, when the first input-side control module 111 does not operate normally or fails, the second output-side control module 122 may receive the second steering control information from the second input-side control module 121 through the communication channel 130, and then share the second steering control information with the first output-side control module 112 (e.g. The second output-side control module 122 transmits the second steering control information to the first output-side control module 112.). Likewise, when the second input-side control module 121 does not operate normally or fails, the first output-side control module 112 may receive the first steering control information from the first input-side control module 111 through the communication channel 130 and then share the first steering control information with the second output-side control module 122 (e.g. The first output-side control module 112 transmits the first steering control information to the second output-side control module 122.). Accordingly, even when a failure or abnormality occurs in any one of the first input-side control module 111 or the second input-side control module 121, the steering control device may normally control the steering motor 40 by sharing the steering control information through the communication channel 130 connecting between the first output-side control module 112 and the second output-side control module 122.

Therefore, the steering control system 100 for safe driving according to an embodiment of the present disclosure may be capable of controlling steering of the vehicle by sharing steering control information through the communication channel 130 connecting between output-side control modules even when a failure occurs in one or more control modules included in the steering control system 100. However, the present disclosure is not limited to the embodiment illustrated in FIG. 2. For example, any one of modules included in the first steering control device 110 and any one of modules included in the second steering control device 120 may be connected to each other by the communication channel 130. The communication channel 130 may connect between the first input-side control module 111 and the second input-side control module 121, between the first input-side control module 111 and the second output-side control module 122, and/or between the first output-side control module 112 and the second input-side control module 121.

Figure 4:
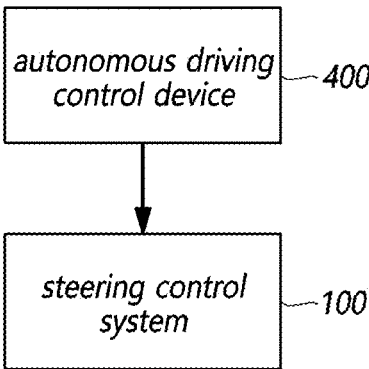
FIG. 4 is a block diagram illustrating an example in which a steering control system controls steering of a vehicle by receiving autonomous driving information according to an embodiment of the present disclosure.
Figure 5:
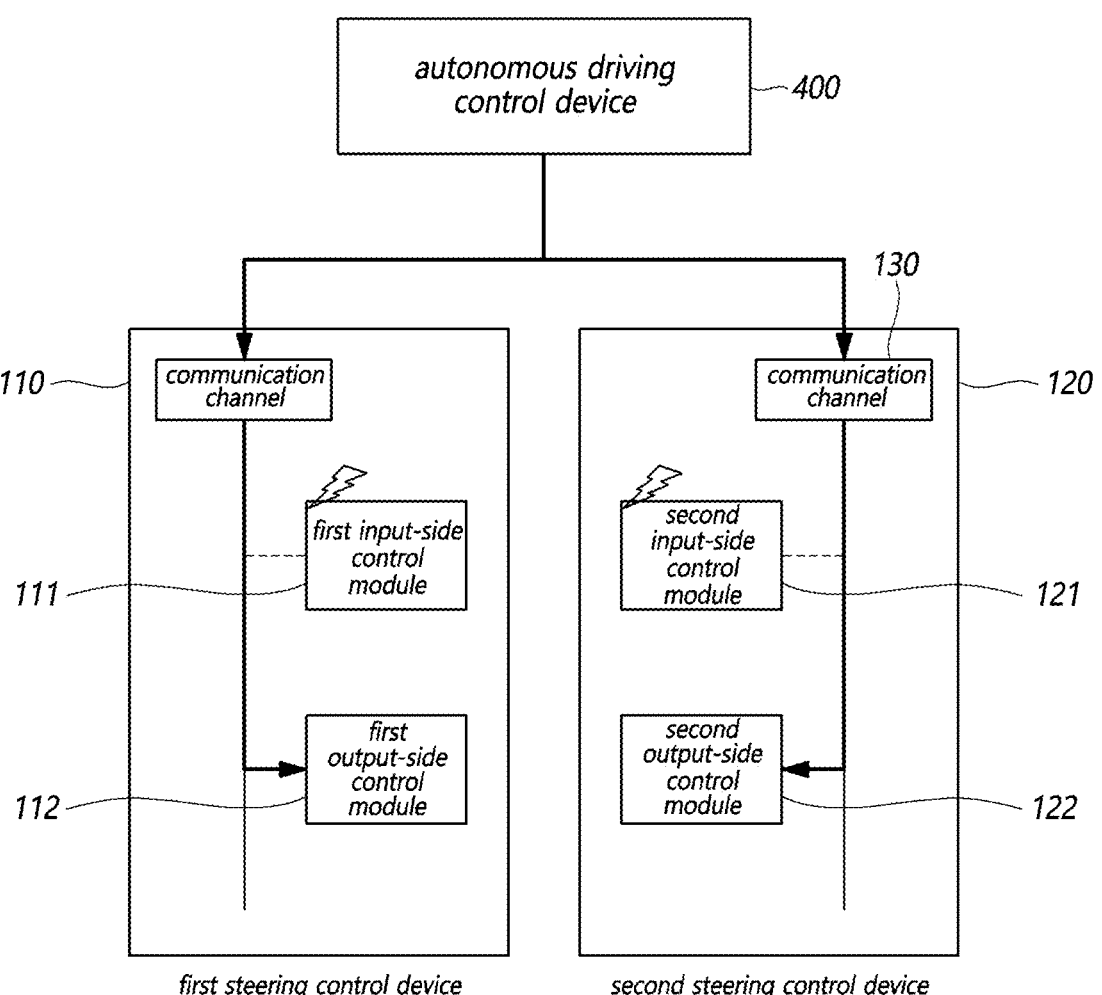
FIGS. 5 and 6 are diagrams illustrating examples in which a steering control system controls steering of a vehicle using autonomous driving information according to an embodiment of the present disclosure.
Figure 6:
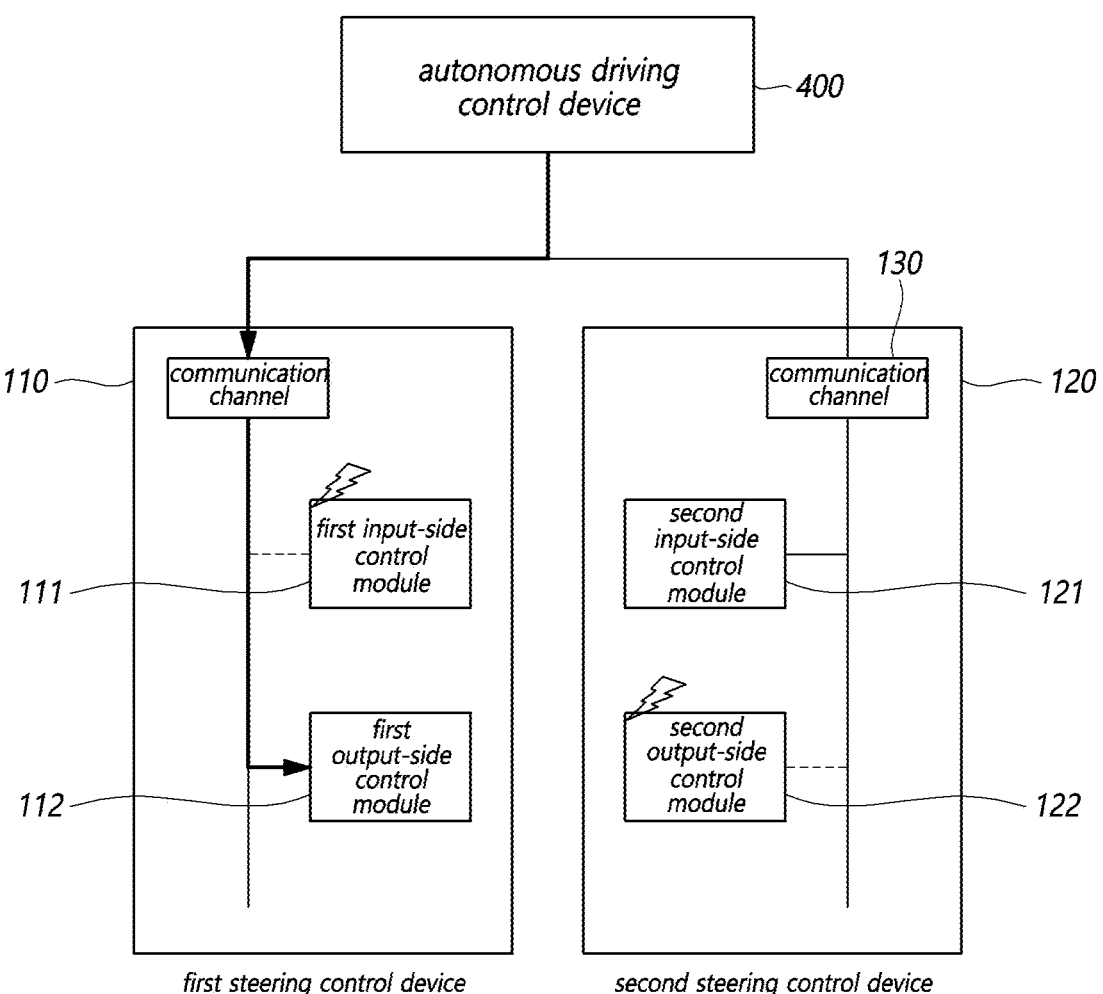

FIG. 4 is a block diagram illustrating an example in which the steering control system 100 controls steering of the vehicle by receiving autonomous driving information according to an embodiment of the present disclosure. FIGS. 5 and 6 are diagrams illustrating examples in which the steering control system 100 controls steering of the vehicle using autonomous driving information according to an embodiment of the present disclosure.

Referring to FIG. 4, the steering control system 100 may be connected to an autonomous driving control device 400 through the communication channel 130. When steering control may not be performed by the first steering control device 110 and the second steering control device 120, the steering control system 100 may control the steering motor 40 by receiving autonomous driving information transmitted from the autonomous driving control device 400. Further, the autonomous driving control device 400 may generate autonomous driving information by using sensors inside and/or outside the vehicle.

For example, the autonomous driving control device 400 may include, and/or may be connected to, one or more of a GPS receiver, a radar/lidar, an external camera, an indoor camera, a driver gaze detector, a steering wheel manipulation detector, an autonomous driving controller, and a steering controller. The autonomous driving controller may include a precise positioning unit, a recognition unit, a control unit, a control right transfer determination unit, and a driver intervention determination unit.

The GPS receiver may receive a position signal from a position satellite. In this case, the position signal may be used to generate geographic location information about the vehicle. The radar and/or lidar may detect objects around the vehicle. The radar and/or lidar may be used to detect objects in front of, on the sides of, and behind the vehicle, to calculate the distance to the detected object, to identify whether the detected object is a static object or a dynamic object, to measure the moving speed of the detected dynamic object, to identify whether the detected dynamic object is a pedestrian or a vehicle, and to identify the state of the driving road and a facility through a high-resolution terrain scan. The external camera may be mounted outside the vehicle to capture images of the front, side, and rear of the vehicle. To that end, a plurality of external cameras may be provided in the vehicle. An image captured by an external camera may be used for, e.g., identifying lanes and objects around the vehicle and implementing augmented reality.

The autonomous driving control device 400 may monitor whether the steering control system 100 fails. When the steering control system 100 does not generate the steering control information, or when the steering control system 100 alone may not control the steering of the vehicle, the autonomous driving control device 400 may generate the autonomous driving information.

The autonomous driving control device 400 may generate autonomous driving information based on signals obtained from the inside and outside of the vehicle. The autonomous driving information may include autonomous driving steering information, autonomous driving braking control information, and autonomous driving space information. The autonomous driving steering information may include internal information such as a reaction force motor angle signal, a rackstroke signal, a driving motor angle signal, a torque signal, a steering angle signal, and a yaw rate signal used to control steering of the vehicle, and detection information about the outside of the vehicle, such as from the GPS receiver, radar, lidar, external camera, and indoor camera. Accordingly, the autonomous driving control device 400 may control the steering device, the braking device, and any other device of the vehicle based on the autonomous driving information. In other words, when entering or performing the autonomous driving mode, the autonomous driving control device 400 may generate autonomous driving information and control the autonomous driving of the vehicle accordingly. However, this is merely an example for illustration purposes only, and the present disclosure is not limited thereto. A method for generating and utilizing autonomous driving information and autonomous driving information may be variously configured as necessary, unless in contradicts the technical spirit of the disclosure.

When steering control may not be performed by the first steering control device 110 and the second steering control device 120 in a state other than the autonomous driving mode but at least one of the first output-side control module 112 or the second output-side control module 122 is in a normal state, the autonomous driving control device 400 may generate autonomous driving information. Thereafter, the autonomous driving control device 400 may transmit the generated autonomous driving information to the steering control system 100. An output-side control module in the normal state may control steering of the vehicle by controlling the steering motor 40 based on the autonomous driving steering information included in the received autonomous driving information.

Hereinafter, some exemplary embodiments of a method for controlling steering using autonomous driving information are described in more detail.

FIG. 5 illustrates an example in which a failure occurs in the first input-side control module 111 and the second input-side control module 121. In this case, the steering control system 100 may not generate the first steering control information and the second steering control information by the first input-side control module 111 and the second input-side control module 121. Accordingly, steering control may not be performed by the first steering control device 110 and the second steering control device 120. Instead, the first output-side control module 112 and the second output-side control module 122 may receive autonomous driving information through the communication channel 130 to control the steering motor 40.

As another example, when a failure occurs in the first input-side control module 111, the second input-side control module 121, and the second output-side control module 122, the steering control system 100 may not generate the first steering control information and the second steering control information. Accordingly, steering control may not be performed by the first steering control device 110 and the second steering control device 120. Instead, the first output-side control module 112 may control the steering motor 40 by receiving autonomous driving steering information through the communication channel 130.

As still another example, when a failure occurs in the first input-side control module 111, the second input-side control module 121, and the first output-side control module 112, the second output-side control module 122 may control the steering motor 40 based on the autonomous driving steering information received through the communication channel 130.

FIG. 6 illustrates an example in which a failure occurs in the first input-side control module 111 and the second output-side control module 122 according to an embodiment of the present disclosure. In this case, the first output-side control module 112 may control the steering motor 40 based on the autonomous driving steering information received from the autonomous driving control device 400 through the communication channel 130.

In other words, the first input-side control module 111 may fail to generate the first steering control information in an abnormal state. However, as illustrated in FIG. 6, since the second input-side control module 121 is in a normal state, the second steering control information may be generated by the second input-side control module 121. However, since the second output-side control module 122 has failed, the steering motor 40 may not be controlled by the second steering control device 120. Accordingly, in this case, steering control may not be performed by the first steering control device 110 and the second steering control device 120. Accordingly, the first output-side control module 112 may receive autonomous driving information through the communication channel 130 from the autonomous driving control device 400 and control the steering motor 40 based on the autonomous driving information.

Likewise, when a failure occurs in the second input-side control module 121 and the first output-side control module 112, the second output-side control module 122 may control the steering motor 40 based on the autonomous driving steering information received from the autonomous driving control device 400. The second input-side control module 121 may fail to generate the second steering control information. However, since the first input-side control module 111 is in a normal state, the first steering control information may be generated by the first input-side control module 111. However, because a failure occurs in the first output-side control module 112, the steering motor 40 may not be controlled by the first steering control device 110. Accordingly, in this case, steering control may not be performed by the first steering control device 110 and the second steering control device 120. Accordingly, the second output-side control module 122 may receive autonomous driving information through the communication channel 130 from the autonomous driving control device 400 and control the steering motor 40 based on the autonomous driving information.

Therefore, even when steering control by the first steering control device 110 and the second steering control device 120 may not be performed, the steering control system 100 for safe driving according to an embodiment of the present disclosure may be capable of controlling steering of the vehicle by receiving autonomous driving information through the communication channel 130.

Figure 7:
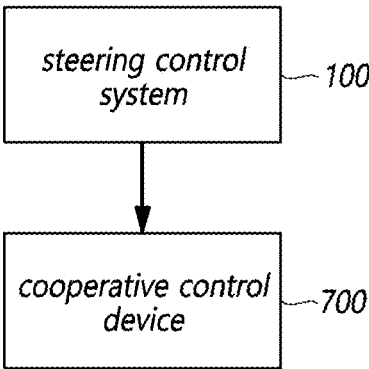
FIG. 7 is a block diagram illustrating an example in which a steering control system controls steering of a vehicle through cooperative control by transmitting steering control information according to an embodiment of the present disclosure.
Figure 8:
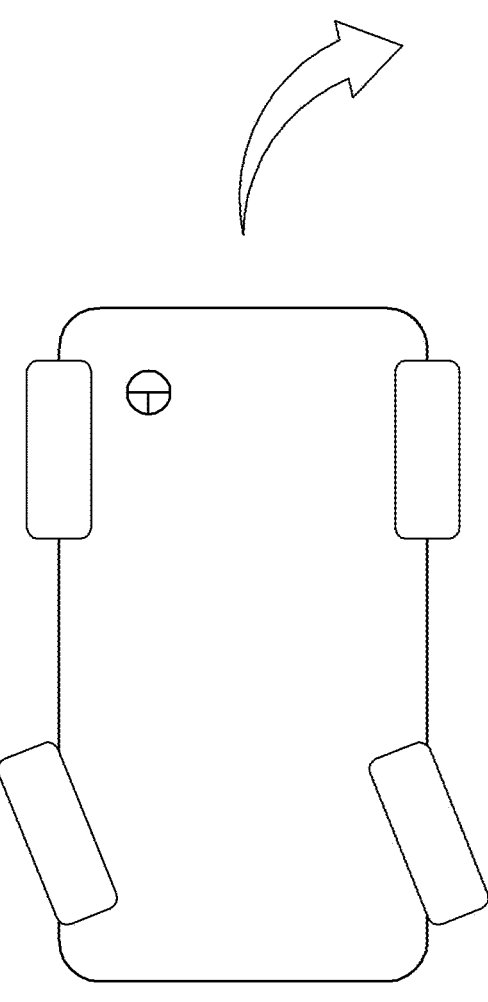
FIG. 8 is a view illustrating a method for controlling steering of a vehicle using rear wheels according to an embodiment of the present disclosure.
Figure 9:
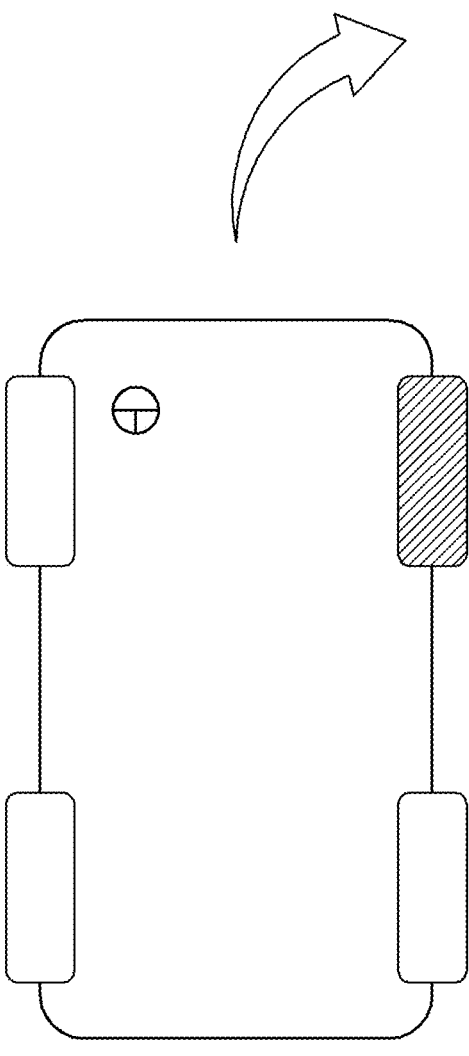
FIG. 9 is a view illustrating a method for controlling steering of a vehicle using brakes or a steer-by-brake type system according to an embodiment of the present disclosure.
Figure 10:
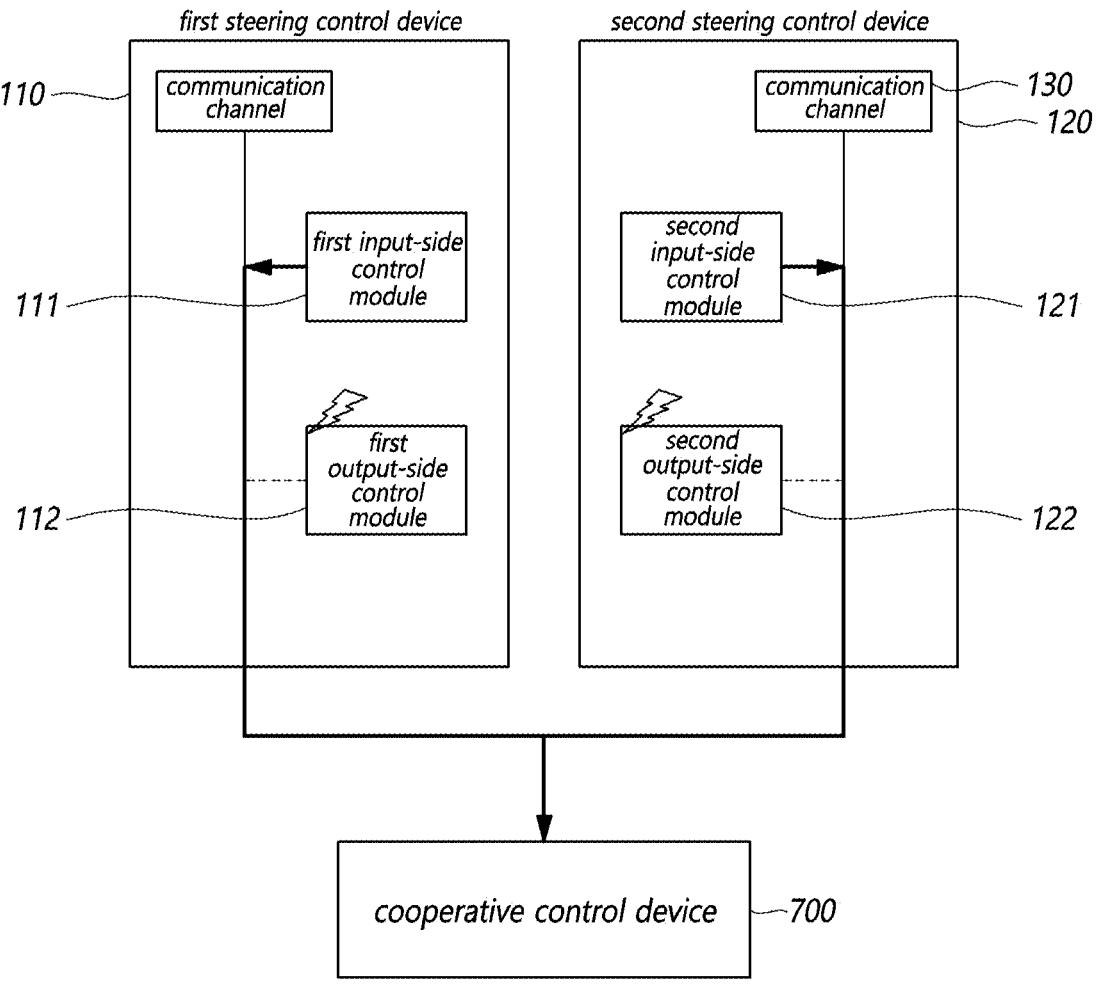
FIGS. 10 and 11 are diagrams illustrating controlling steering of a vehicle using cooperative control according to an embodiment of the present disclosure.
Figure 11:
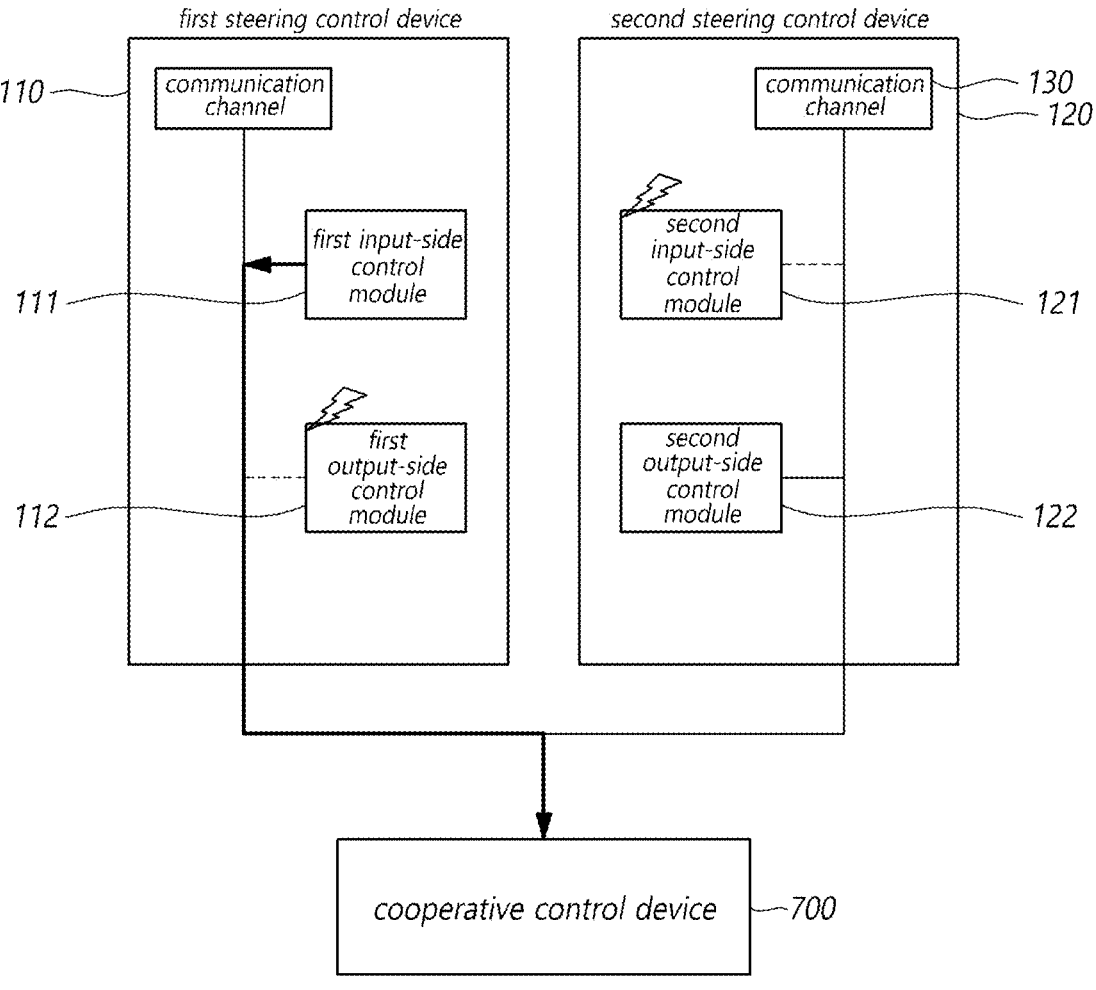

FIG. 7 is a diagram for illustrating an example in which the steering control system 100 controls steering of a vehicle through cooperative control by transmitting steering control information according to an embodiment of the present disclosure. FIG. 8 is a view illustrating a method for controlling steering of a vehicle using rear wheels according to an embodiment of the present disclosure. FIG. 9 is a view illustrating a method for controlling steering using partial or asymmetric braking according to an embodiment of the present disclosure. FIGS. 10 and 11 are diagrams illustrating controlling steering of a vehicle using cooperative control according to embodiments of the present disclosure.

Referring to FIG. 7, the steering control system 100 may be connected to a cooperative control device 700 through the communication channel 130. When steering control may not be performed by the first steering control device 110 and the second steering control device 120, the steering control system 100 may transmit any one of the first steering control information or the second steering control information to the cooperative control device 700 through the communication channel 130 to control steering of the vehicle. For example, the cooperative control device 700 may include any one of a rear wheel steering control device or a steer-by-brake control device, but not limited there to. Any device capable of steering the vehicle or changing the direction of movement of the vehicle may be used as the cooperative control device 700.

Hereinafter, exemplary embodiments of a method for controlling steering of the vehicle by performing cooperative control are described in more detail.

Referring to FIG. 8, a method for controlling steering of the vehicle using rear wheels is described as an example of cooperative control.

In a vehicle equipped with a rear wheel steering system capable of steering rear wheels, one or more actuators may be installed in the rear suspension of the vehicle to control steering or rotation of the rear wheels. Further, the rear wheel steering control device may analyze the driving situation of the vehicle with the steering angle of the steering wheel or the like. When it is determined that the vehicle is driving at a low speed, the rear wheel steering control device may adjust the steering angle of the rear wheels in a direction opposite to that of the front wheels to reduce the rotation radius of the vehicle. Further, when it is determined that the vehicle is driving at a high speed, the rear wheel steering controller may adjust the steering angle of the rear wheels in the same direction as the front wheels, thereby minimizing the lateral sliding angle in a situation for avoiding, for example, but not limited to, an obstacle. Accordingly, when the steering control system 100 controls steering of the vehicle by controlling the front wheels, steering may be controlled more stably and efficiently by performing the steering of the rear wheels using the rear wheel steering control device.

Here, when steering control may not be performed by the first steering control device 110 and the second steering control device 120, any one of the first input-side control module 111 or the second input-side control module 121 may maintain the front wheels of the vehicle in a straight state. Further, any one of the first input-side control module 111 or the second input-side control module 121 may transmit a rear wheel steering control request signal for requesting the steering control using the rear wheels to the rear wheel steering control device. Thereafter, the rear wheel steering control device may perform to control the steering of the rear wheels based on either the first steering control information or the second steering control information.

When the rear wheel steering control is performed, the direction of the rear wheels may be set as a reverse direction of the front wheel steering direction based on either the first steering control information or the second steering control information. For example, in the case of front wheel steering control, when the driver or controller steers the vehicle in the right direction, the front wheels are controlled to be directed or rotated to the right. However, as illustrated in FIG. 8, in the case of rear wheel steering control, steering is controlled by adjusting the angle of the rear wheels with the front wheels fixed parallel to the direction connecting the front and rear sides of the vehicle body. Therefore, when the rear wheels are controlled to be directed in the left direction, which is the reverse direction in which the front wheels are supposed to be controlled, the vehicle proceeds in the right direction. Accordingly, when the rear wheel steering control is performed, the direction of the rear wheels may be set as a reverse direction of the front wheel steering direction based on either the first steering control information or the second steering control information. However, this is merely an example, and embodiments of the disclosure are not limited thereto. The rear wheel steering control device for performing the rear wheel steering control and the method for controlling steering using the rear wheels may be variously configured as necessary, unless contradictory to the technical spirit of the disclosure.

Referring to FIG. 9, a method for controlling steering using steer-by-brake is described as another example of cooperative control.

A vehicle equipped with a steer-by-brake system may perform steering control of the vehicle by applying a braking pressure to each wheel or tire. Accordingly, when the steering control system 100 controls the steering motor by controlling the front wheels, the steering control system 100 may also generate a left-right longitudinal force difference in the physically driving vehicle by further using the steer-by-brake device, thereby generating a yaw moment and a lateral force to enable efficient turning.

Here, when steering control may not be performed by the first steering control device 110 and the second steering control device 120, any one of the first input-side control module 111 or the second input-side control module 121 may transmit a steer-by-brake steering control request signal for requesting the steering control using the steer-by-brake system to the steer-by-brake control device. Thereafter, the steer-by-brake control device may set a braking pressure for each wheel or tire based on either the first steering control information or the second steering control information. Thereafter, the steer-by-brake control device may perform the steering control of the vehicle by applying the set braking pressure to each wheel or tire.

For example, when the driver or controller controls to steer the vehicle in the right direction, the steer-by-brake control device may apply a braking pressure to the right front wheel as illustrated in FIG. 9. Accordingly, the torque of the left front wheel is larger than that of the right front wheel, thereby turning the vehicle to the right. However, this is merely an example for illustration purposes only, and the present disclosure is not limited thereto. The configuration of the steer-by-brake control device for performing steer-by-brake steering and the method for performing steer-by-brake may be variously configured as necessary, unless contradictory to the technical spirit of the disclosure.

FIG. 10 illustrates an example in which a failure occurs in the first output-side control module 112 and the second output-side control module 122. In this case, the steering control system 100 may not control the steering motor 40. Accordingly, because steering control may not be performed by the first steering control device 110 and the second steering control device 120 may not be performed, the first input-side control module 111 and the second output-side control module 122 may transmit any one of the first steering control information or the second steering control information to the cooperative control device 700 through the communication channel 130 to control the steering of the vehicle.

As another example, when a failure occurs in the second input-side control module 121, the first output-side control module 112, and the second output-side control module 122, the steering control system 100 may not control the steering motor 40. Accordingly, because steering control may not be performed by the first steering control device 110 and the second steering control device 120, the first input-side control module 111 may transmit the first steering control information to the cooperative control device 700 through the communication channel 130 to control the steering of the vehicle.

Likewise, when a failure occurs in the first input-side control module 111, the first output-side control module 112, and the second output-side control module 122, the steering control system 100 may not control the steering motor 40. Accordingly, because steering control may not be performed by the first steering control device 110 and the second steering control device 120, the second input-side control module 121 may transmit the second steering control information to the cooperative control device 700 through the communication channel 130 to control the steering of the vehicle.

FIG. 11 illustrates an example in which a failure occurs in the second input-side control module 121 and the first output-side control module 112. In this case, the steering control system 100 may not control the steering motor 40. Accordingly, because steering control may not be performed by the first steering control device 110 and the second steering control device 120, the first input-side control module 111 may transmit the first steering control information to the cooperative control device 700 through the communication channel 130 to control the steering of the vehicle.

In the example of FIG. 11, the first output-side control module 112 has a failure and thus may not control the steering motor 40 regardless of whether the first steering control information is generated by the first input-side control module 111. Further, as illustrated in FIG. 11, even though the second output-side control module 122 is in a normal state, the second output-side control module 122 may not receive the second steering control information due to a failure in the second input-side control module 121, and thus the second steering control device 120 may not control the steering motor 40. Accordingly, because the steering motor 40 may not be controlled by the first steering control device 110 and the second steering control device 120, the first input-side control module 111 may transmit the first steering control information to the cooperative control device 700 through the communication channel 130. The cooperative control device 700 may control the steering of the vehicle according to the cooperative control based on the first steering control information.

Likewise, when a failure occurs in the first input-side control module 111 and the second output-side control module 122, the steering control system 100 may not control the steering motor 40. Accordingly, because steering control may not be performed by the first steering control device 110 and the second steering control device 120, the second input-side control module 121 may transmit the second steering control information to the cooperative control device 700 through the communication channel 130 to control the steering of the vehicle.

Here, the second output-side control module 122 has a failure and thus may not control the steering motor 40 regardless of whether the second steering control information is generated by the second input-side control module 121. Further, even though the first output-side control module 112 is in a normal state, the first output-side control module 112 may not receive the first steering control information due to a failure in the first input-side control module 111, and thus the first steering control device 110 may not control the steering motor 40. Accordingly, because the steering motor 40 may not be controlled by the first steering control device 110 and the second steering control device 120, the second input-side control module 121 may transmit the second steering control information to the cooperative control device 700 through the communication channel 130. The cooperative control device 700 may control steering according to the cooperative control based on the second steering control information.

Therefore, the steering control system 100 for safe driving according to an embodiment of the present disclosure may control the steering of the vehicle by performing cooperative control by transmitting either the first steering control information or the second steering control information to a cooperative control device even when steering control may not be performed by the first steering control device 110 and the second steering control device 120.

Hereinafter, a steering control method capable of performing some or all of the embodiments described with reference to FIGS. 1 to 11 is described with reference to the drawings. The above-described description may be omitted to avoid redundant description and, in that case, the omitted content may be applied in substantially the same manner to the following description as long as it does not go against the technical spirit of the disclosure.

Figure 12:
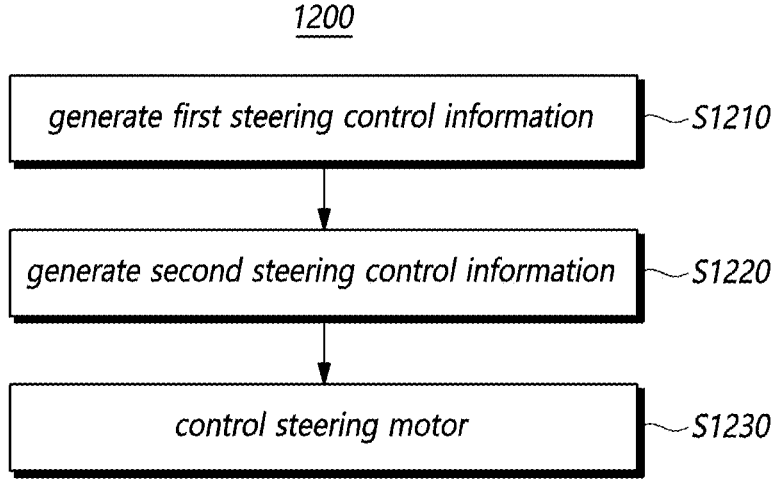
FIG. 12 is a flowchart illustrating a steering control method performed by a steering control system according to an embodiment of the present disclosure.

FIG. 12 is a flowchart illustrating a steering control method 1200 performed by a steering control system according to an embodiment of the present disclosure.

Referring to FIG. 12, a first input-side control module of a first steering control device may generate first steering control information (step S1210), and a second input-side control module of a second steering control device may generate second steering control information (step S1220).

The steering control system according to some embodiments of the present disclosure may include a first steering control device and a second steering control device.

The first steering control device may include a first input-side control module configured to generate first steering control information and a first output-side control module configured to control a steering motor. The second steering control device may include a second input-side control module configured to generate second steering control information and a second output-side control module configured to control the steering motor.

According to an example, the steering control system may be configured to be redundant such that when detecting a failure associated with the first steering control device, the first input-side control module transfers a control right for controlling the steering motor to the second input-side control module or, when detecting a failure associated with the second steering control device, the second input-side control module transfers the control right for controlling the steering motor to the first input-side control module. In an exemplary embodiment, the first input-side control module and the second input-side control module may be configured in a master-slave relationship to generate steering control information. For example, when the first input-side control module does not operate normally, the second input-side control module may generate steering control information. However, this is merely an example, and the present disclosure is not limited thereto. The relationship between the first input-side control module and the second input-side control module may be variously configured as necessary, unless it contradicts the technical spirit of the disclosure.

Likewise, the steering control system may be configured to be redundant such that when detecting a failure associated with the second steering control device or controller, the first output-side control module transfers the control right for controlling the steering motor to the second output-side control module or, when detecting a failure associated with the second steering control device or controller, the second output-side control module transfers the control right for controlling the steering motor to the first output-side control module. In an exemplary embodiment, the first output-side control module and the second output-side control module may be configured in a master-slave relationship to control the steering motor based on the steering control information. However, this is merely an example, and the present disclosure is not limited thereto. The relationship between the first output-side control module and the second output-side control module may be variously configured as necessary, unless it contradicts the technical spirit of the disclosure.

FIG. 12 illustrates that step S1220 is performed after step S1210, but this is one of examples for illustration purposes only, and the present disclosure is not limited thereto. Steps S1210 and S1220 may be performed regardless of the order or may be performed simultaneously.

Referring back to FIG. 12, the first output-side control module and the second output-side control module may receive any one of the first steering control information or the second steering control information, and control the steering motor based on the received steering control information (step S1230).

The first output-side control module may receive the first steering control information from the first input-side control module through the communication channel to control the steering motor. Likewise, the second output-side control module may receive the second steering control information from the second input-side control module through the communication channel to control the steering motor.

For example, the communication channel transmits and receives steering control information using a control area network (CAN) which is shared communication channel for vehicles and may communicate with modules equipped in the vehicle. Alternatively or additionally, the communication channel 130 may use an inter micro CAN (IMC) connected between two control modules or a private CAN.

Further, the steering control device may control the steering motor at a performance up to 50% even when a failure occurs in any one of the first output-side control module or the second output-side control module. For instance, the steering motor may be a dual winding type motor, and the first output-side control module and the second output-side control module each may control the steering motor at a performance up to 50%.

When steering control may not be performed by the first steering control device and the second steering control device, the steering control device may receive autonomous driving steering information to control steering of the vehicle or transmit either the first steering control information or the second steering control information to perform cooperative control.

As an example, when steering control may not be performed by the first steering control device and the second steering control device, the first or second steering control device may receive autonomous driving steering information through the communication channel. Thereafter, at least one module which is in a normal state among the first output-side control module and the second output-side control module may control the steering motor based on the autonomous driving steering information.

As another example, when steering control by the first steering control device and the second steering control device may not be performed, the first or second steering control device may transmit at least one of the generated first steering control information or second steering control information through the communication channel to perform cooperative control. for example, the cooperative control may be rear wheel steering which controls steering by controlling the rear wheels or steer-by-brake which controls steering by controlling the brake on each of the wheels of the vehicle. In other words, when steering control by the first steering control device and the second steering control device may not be performed, steering control using a rear wheel steering (RWS) system provided in the vehicle or steering control using the steer-by-brake system may be performed. However, this is merely an example for illustration purposes only, and the present disclosure is not limited thereto. As another example, the cooperative control may be performed using, e.g., a function, device, or system capable of controlling the steering of the vehicle based on steering information unless it contradicts the technical spirit of the disclosure.

Further, when a failure occurs in the first input-side control module, the first output-side control module, the second input-side control module, and the second output-side control module, steering control may be performed according to a predetermined or preset vehicle safe driving operation. For example, when a failure occurs in one or more control modules included in the steering control system, the steering control system may perform a limp aside operation configured to prevent more failures from occurring in the vehicle by rebooting the failed control module and executing a performance down mode. Further, the steering control system may perform a stop in place operation that leads the driver to stop the vehicle. Further, the steering control system may send a notification about a control module failure to the driver. For example, the notification of the control module failure may include a warning using an output interface of an in-vehicle display, a speaker, a haptic module, or the like. Alternatively, the notification of the control module failure may include a message transmitted to a personal communication device of the driver (e.g. a driver's phone or mobile computer device such as a tablet or a laptop) communicatively connected to the vehicle or an external server related to control module management.

In an exemplary embodiment of the present disclosure, the first output-side control module and the second output-side control module may be connected through the communication channel. Accordingly, the first output-side control module may transmit the first steering control information received from the first input-side control module to the second output-side control module through the communication channel. Likewise, the second output-side control module may transmit the second steering control information received from the second input-side control module to the first output-side control module through the communication channel.

In another exemplary embodiment of the present disclosure, the steering control system may be connected to an autonomous driving control device through the communication channel. When steering control may not be performed by the first steering control device and the second steering control device, the steering control system may control the steering motor by receiving autonomous driving information transmitted from the autonomous driving control device. Further, the autonomous driving control device may generate autonomous driving information by further using sensors inside and/or outside the vehicle.

The autonomous driving control device may monitor whether the steering control system fails. When the steering control system does not generate the steering control information, or when the steering control system alone may not control the steering of the vehicle, the autonomous driving control device may generate the autonomous driving information.

When a failure occurs in the first input-side control module and the second input-side control module, the steering control system may not generate the first steering control information and the second steering control information. Accordingly, because steering control may not be performed by the first steering control device and the second steering control device, the first output-side control module and the second output-side control module may receive autonomous driving information from an autonomous driving control device through the communication channel to control the steering motor.

When a failure occurs in the first input-side control module, the second input-side control module, and the second output-side control module, the steering control system may not generate the first steering control information and the second steering control information. Accordingly, because steering control may not be performed by the first steering control device and the second steering control device, the first output-side control module may control the steering motor by receiving the autonomous driving steering information from the autonomous driving control device through the communication channel.

Likewise, when a failure occurs in the first input-side control module, the second input-side control module, and the first output-side control module, the second output-side control module may control the steering motor based on the autonomous driving steering information received from the autonomous driving control device through the communication channel.

When a failure occurs in the first input-side control module and the second output-side control module, the first output-side control module may control the steering motor based on the autonomous driving steering information.

In other words, the first input-side control module may fail to generate the first steering control information. However, since the second input-side control module is in a normal state, the second the second input-side control module can generate steering control information. However, since the second output-side control module has failed, the steering motor may not be controlled by the second steering control device. Accordingly, because steering control may not be performed by the first steering control device and the second steering control device, the first output-side control module may receive the autonomous driving information through the communication channel and control the steering motor based on the autonomous driving information.

Likewise, when a failure occurs in the second input-side control module and the first output-side control module, the second output-side control module may control the steering motor based on the autonomous driving steering information. The second input-side control module may fail to generate the second steering control information. However, since the first input-side control module is in a normal state, the first input-side control module can generate the first steering control information. However, since a failure occurs in the first output-side control module, the steering motor may not be controlled by the first steering control device. Accordingly, because steering control may not be performed by the first steering control device and the second steering control device, the second output-side control module may receive the autonomous driving information from the autonomous driving control device through the communication channel and control the steering motor based on the autonomous driving information.

Further, the steering control system may be connected to a cooperative control device through the communication channel. When steering control may not be performed by the first steering control device and the second steering control device, the steering control system may transmit any one of the first steering control information or the second steering control information to the cooperative control device through the communication channel to control the steering of the vehicle. For example, the cooperative control device may include any one of a rear wheel steering control device or a steer-by-brake control device, but not limited there to. Any device capable of steering the vehicle or changing the direction of movement of the vehicle may be used as the cooperative control device.

In a vehicle equipped with a rear wheel steering system capable of steering rear wheels, one or more actuators may be installed in the rear suspension of the vehicle to control steering or rotation of the rear wheels. Further, the rear wheel steering control device may analyze the driving situation of the vehicle with the steering angle of the steering wheel or the like. When it is determined that the vehicle is driving at a low speed, the rear wheel steering control device may adjust the steering angle of the rear wheels in a direction opposite to that of the front wheels to reduce the rotation radius of the vehicle. Further, when it is determined that the vehicle is driving at a high speed, the rear wheel steering controller may adjust the steering angle of the rear wheels in the same direction as the front wheels, thereby minimizing the lateral sliding angle in a situation for avoiding, for example, but not limited to, an obstacle. Accordingly, when the steering control system controls steering of the vehicle by controlling the front wheels, steering may be controlled more stably and efficiently by performing the steering of the rear wheels using the rear wheel steering control device.

Here, when steering control may not be performed by the first steering control device and the second steering control device, any one of the first input-side control module or the second input-side control module may maintain the front wheels of the vehicle in a straight state. Further, any one of the first input-side control module or the second input-side control module may transmit a rear wheel steering control request signal for requesting the steering control using the rear wheels to the rear wheel steering control device. Thereafter, the rear wheel steering control device may perform to control the steering of the rear wheels based on either the first steering control information or the second steering control information.

In addition, a vehicle equipped with a steer-by-brake system may perform steering control of the vehicle by applying a braking pressure to each wheel or tire. Accordingly, when the steering control system controls the steering motor by controlling the front wheels, the steering control system may also generate a left-right longitudinal force difference in the physically driving vehicle by further using the steer-by-brake device, thereby generating a yaw moment and a lateral force to enable efficient turning.

Here, when steering control may not be performed by the first steering control device and the second steering control device, any one of the first input-side control module or the second input-side control module may transmit a steer-by-brake steering control request signal for requesting the steering control using the steer-by-brake system to the steer-by-brake control device. Thereafter, the steer-by-brake control device may set a braking pressure for each wheel or tire based on either the first steering control information or the second steering control information. Thereafter, the steer-by-brake control device may perform the steering control of the vehicle by applying the set braking pressure to each wheel or tire.

When a failure occurs in the first output-side control module and the second output-side control module, the steering control system may not control the steering motor. Accordingly, because steering control may not be performed by the first steering control device and the second steering control device, the first input-side control module and the second output-side control module may transmit any one of the first steering control information or the second steering control information to the cooperative control device through the communication channel to control the steering of the vehicle.

As another example, when a failure occurs in the second input-side control module, the first output-side control module, and the second output-side control module, the steering control system may not control the steering motor. Accordingly, because steering control may not be performed by the first steering control device and the second steering control device, the first input-side control module may transmit the first steering control information to the cooperative control device through the communication channel to control the steering of the vehicle.

Likewise, when a failure occurs in the first input-side control module, the first output-side control module, and the second output-side control module, the steering control system may not control the steering motor. Accordingly, because steering control may not be performed by the first steering control device and the second steering control device, the second input-side control module may transmit the second steering control information to the cooperative control device through the communication channel to control the steering of the vehicle.

When a failure occurs in the second input-side control module and the first output-side control module, the steering control system may not control the steering motor. Accordingly, because steering control may not be performed by the first steering control device and the second steering control device, the first input-side control module may transmit the first steering control information to the cooperative control device through the communication channel to control the steering of the vehicle.

In this example, the first output-side control module has a failure and thus may not control the steering motor regardless of whether the first steering control information is generated by the first input-side control module. Further, even though the second output-side control module is in a normal state, the second output-side control module may not receive the second steering control information due to a failure in the second input-side control module 121, and thus the second output-side control module may not control the steering motor. Accordingly, because the steering motor may not be controlled by the first steering control device and the second steering control device, the first input-side control module may transmit the first steering control information to the cooperative control device through the communication channel. The cooperative control device may control the steering of the vehicle according to the cooperative control based on the first steering control information.

Likewise, when a failure occurs in the first input-side control module and the second output-side control module, the steering control system may not control the steering motor. Accordingly, because steering control may not be performed by the first steering control device and the second steering control device, the second input-side control module may transmit the second steering control information to the cooperative control device through the communication channel to control the steering of the vehicle.

Here, the second output-side control module has a failure and thus may not control the steering motor regardless of whether the second steering control information is generated by the second input-side control module. Further, even though the first output-side control module is in a normal state, the first output-side control module may not receive the first steering control information due to a failure in the first input-side control module, and thus the first output-side control module may not control the steering motor. Accordingly, because the steering motor may not be controlled by the first steering control device and the second steering control device, the second input-side control module may transmit the second steering control information to the cooperative control device through the communication channel. The cooperative control device may control steering according to the cooperative control based on the second steering control information.

Therefore, a method according to some embodiments of the present disclosure may respond to a failure in a control module by sharing steering control information, generating autonomous driving steering information, or performing cooperative control when a failure occurs in one or more steering control modules, thereby controlling the steering of the vehicle even when a failure occurs in one or more steering control modules.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering control system comprising:
a first steering controller including a first input-side control module configured to generate first steering control information for controlling steering of a vehicle and a first output-side control module configured to control a steering motor to control the steering of the vehicle; and
a second steering controller including a second input-side control module configured to generate second steering control information for controlling the steering of the vehicle and a second output-side control module configured to control the steering motor to control the steering of the vehicle,
wherein the steering control system is configured to, when the steering of the vehicle is unable to be controlled by the first steering controller and the second steering controller, receive autonomous driving steering information, configured to control the steering of the vehicle by autonomous driving, to control the steering of the vehicle or transmit the first steering control information or the second steering control information to perform cooperative control, and
wherein the first output-side control module of the first steering controller and the second output-side control module of the second steering controller are configured to, when the steering of the vehicle is unable to be controlled by the first steering controller and the second steering controller, control the steering motor based on the autonomous driving steering information.

2. The steering control system of claim 1, wherein:
the first output-side control module of the first steering controller is configured to receive the first steering control information from the first input-side control module of the first steering controller and share the first steering control information with the second output-side control module of the second steering controller, and
the second output-side control module of the second steering controller is configured to receive the second steering control information from the second input-side control module of the second steering controller and share the second steering control information with the first output-side control module of the first steering controller.

3. The steering control system of claim 1, wherein the first output-side control module of the first steering controller is configured to, in response to a failure of the first input-side control module of the first steering controller, receive the second steering control information from the second output-side control module of the second steering controller through a communication channel.

4. The steering control system of claim 1, wherein the second output-side control module of the second steering controller is configured to, in response to a failure of the second input-side control module of the second steering controller, receive the first steering control information from the first output-side control module of the first steering controller through a communication channel.

5. The steering control system of claim 1, wherein the first output-side control module of the first steering controller and the second output-side control module of the second steering controller are configured to, in response to a failure of the first input-side control module of the first steering controller and the second input-side control module of the second steering controller, control the steering motor based on the autonomous driving steering information.

6. The steering control system of claim 1, wherein the first output-side control module of the first steering controller is configured to, in response to a failure of the first input-side control module of the first steering controller and the second input-side control module and the second output-side control module of the second steering controller, control the steering motor based on the autonomous driving steering information.

7. The steering control system of claim 1, wherein the second output-side control module of the second steering controller is configured to, in response to a failure of the first input-side control module and the first output-side control module of the first steering controller and the second input-side control module of the second steering controller, control the steering motor based on the autonomous driving steering information.

8. The steering control system of claim 1, wherein the first output-side control module of the first steering controller is configured to, in response to a failure of the first input-side control module of the first steering controller and the second output-side control module of the second steering controller, control the steering motor based on the autonomous driving steering information.

9. The steering control system of claim 1, wherein the second output-side control module is configured to, in response to a failure of the second input-side control module of the second steering controller and the first output-side control module of the first steering controller, control the steering motor based on the autonomous driving steering information.

10. The steering control system of claim 1, wherein the first input-side control module of the first steering controller and the second input-side control module of the second steering controller are configured to, when the steering of the vehicle is unable to be controlled by the first steering controller and the second steering controller, transmit the first steering control information or the second steering control information to perform the cooperative control for one or more of steering, driving, or braking one or more vehicle wheels to control the steering of the vehicle.

11. A steering control system comprising:
a first steering controller including a first input-side control module configured to generate first steering control information for controlling steering of a vehicle and a first output-side control module configured to control a steering motor to control the steering of the vehicle; and
a second steering controller including a second input-side control module configured to generate second steering control information for controlling the steering of the vehicle and a second output-side control module configured to control the steering motor to control the steering of the vehicle,
wherein the steering control system is configured to, when the steering of the vehicle is unable to be controlled by the first steering controller and the second steering controller, receive autonomous driving steering information, configured to control the steering of the vehicle by autonomous driving, to control the steering of the vehicle or transmit the first steering control information or the second steering control information to perform cooperative control,
wherein the first input-side control module of the first steering controller and the second input-side control module of the second steering controller are configured to, when the steering of the vehicle is unable to be controlled by the first steering controller and the second steering controller, transmit the first steering control information or the second steering control information to perform the cooperative control for one or more of steering, driving, or braking one or more vehicle wheels to control the steering of the vehicle,
wherein, if at least two among the first input-side control module, the second input-side control module, the first output-side control module, and the second output-side control module fail, at least one of normal control modules transmits the first steering control information or the second steering control information to perform the cooperative control,
wherein the first output-side control module of the first steering controller and the second output-side control module of the second steering controller are configured to, in response to a failure of the first output-side control module of the first steering controller and the second output-side control module of the second steering controller, transmit the first steering control information or the second steering control information to perform the cooperative control.

12. The steering control system of claim 11, wherein the first input-side control module of the first steering controller is configured to, in response to a failure of the first output-side control module of the first steering controller and the second input-side control module and the second output-side control module of the second steering controller, transmit the first steering control information to perform the cooperative control.

13. The steering control system of claim 11, wherein the second input-side control module of the second steering controller is configured to, in response to a failure of the first input-side control module and the first output-side control module of the first steering controller and the second output-side control module of the second steering controller, transmit the second steering control information to perform the cooperative control.

14. The steering control system of claim 11, wherein the second input-side control module of the second steering controller is configured to, in response to a failure of the first input-side control module of the first steering controller and the second output-side control module of the second steering controller, transmit the second steering control information to perform the cooperative control.

15. The steering control system of claim 11, wherein the first input-side control module of the first steering controller is configured to, in response to a failure of the second input-side control module of the second steering controller and the first output-side control module of the first steering controller, transmit the first steering control information to perform the cooperative control.

16. The steering control system of claim 11, wherein the steering control system is configured to, in response to a failure of the first input-side control module and the first output-side control module of the first steering controller and the second input-side control module and the second output-side control module of the second steering controller, perform steering control according to a predetermined vehicle safe driving operation.

17. The steering control system of claim 11, wherein the cooperative control controls steering of one or more rear wheels based on the first steering control information or the second steering control information.

18. The steering control system of claim 11, wherein the cooperative control controls braking or driving of each wheel of the vehicle based on the first steering control information or the second steering control information.

19. A steering control method comprising:
generating first steering control information and second steering control information for controlling steering of a vehicle by a first input-side control module included in a first steering controller and a second input-side control module included in a second steering controller;
controlling a steering motor by a first output-side control module included in the first steering controller and a second output-side control module included in the second steering controller to control the steering of the vehicle; and when the steering of the vehicle is unable to be controlled by the first steering controller and the second steering controller, receiving autonomous driving steering information, configured to control the steering of the vehicle by autonomous driving, to control the steering of the vehicle or transmitting the first steering control information or the second steering control information to perform cooperative control, wherein, when the steering of the vehicle is unable to be controlled by the first steering controller and the second steering controller, the first output-side control module of the first steering controller and the second output-side control module of the second steering controller control the steering motor based on the autonomous driving steering information.

* * * * *